(12) United States Patent
Hurtta

(10) Patent No.: US 7,437,142 B2
(45) Date of Patent: Oct. 14, 2008

(54) METHOD AND SYSTEM FOR ENABLING EMERGENCY SESSIONS TO BE ESTABLISHED IN ABNORMAL CASES

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/475,831

(22) PCT Filed: Apr. 27, 2001

(86) PCT No.: PCT/EP01/04829

§ 371 (c)(1),
(2), (4) Date: Dec. 8, 2003

(87) PCT Pub. No.: WO02/089515

PCT Pub. Date: Nov. 7, 2002

(65) Prior Publication Data

US 2004/0121755 A1    Jun. 24, 2004

(51) Int. Cl.
*H04M 11/04* (2006.01)
(52) U.S. Cl. .................. 455/404.1; 455/411; 370/218; 370/351; 379/37
(58) Field of Classification Search .............. 455/404.1, 455/407, 408, 445, 527, 558, 552.1, 411, 455/410; 709/225; 370/351, 218; 379/37
See application file for complete search history.

(56) References Cited

U.S. PATENT DOCUMENTS

| 4,916,728 A | 4/1990 | Blair |
| 6,038,440 A * | 3/2000 | Wu ............................ 455/410 |
| 6,775,534 B2 * | 8/2004 | Lindgren et al. ......... 455/404.1 |

| 2002/0056001 A1 * | 5/2002 | Magee et al. ............... 709/225 |

FOREIGN PATENT DOCUMENTS

| DE | 29800711 U1 | 6/1998 |
| WO | 99/20066 | 4/1999 |
| WO | 99/60807 | 11/1999 |

OTHER PUBLICATIONS

Mouly et al., "The GSM System for Mobile Communications—7.1 Location Management," GSM System for Mobile Communications, Comprehensive Overview of the European Digital Cellular System, ÄS.L.Ü: Cell & Sys, 1992, pp. 432-498, XP002129579.

(Continued)

*Primary Examiner*—George Eng
*Assistant Examiner*—Pierre-Louis Desir
(74) *Attorney, Agent, or Firm*—Squire, Sanders & Dempsey, L.L.P.

(57) ABSTRACT

The invention relates to a method and system for connecting a user equipment to a network in abnormal situations normally not allowing the network element to conduct a call. For establishing an emergency session, the network element is adapted to send an indication to the network, the network, when receiving the indication, accepting the call request and establishing the connection for conducting the emergency session.

As an alternative, the network, when receiving the indication, may reject the session request whereupon the user equipment initiates an Anonymous Access PDP Activation procedure with the network. To save time, the network, when receiving the indication, may directly return an Anonymous Access PDP Activation Request message to the user equipment for initiating the Anonymous Access PDP Activation procedure. The network, when receiving the session request including the called number, may be adapted to analyze the called number and, when detecting that the called number is an emergency number, to accept the call request and establish the connection for conducting the emergency session.

46 Claims, 12 Drawing Sheets

OTHER PUBLICATIONS

Chakrabarti et al., A New Architecture for Global Wireless Position Wireless Services, ICC '99, 1999 IEEE International Conference on Communications, Conference Record, Vancouver, CA, Jun. 6-10, 1999, IEEE International Conference on Communications, New York, NY: IEEE US, vol. 3, Jun. 6, 1999, pp. 1779-01783, XP000903675.

* cited by examiner

METHOD AND SYSTEM FOR ENABLING EMERGENCY SESSIONS TO BE ESTABLISHED IN ABNORMAL CASES

FIELD AND BACKGROUND OF THE INVENTION

The invention generally relates to the connection of emergency sessions such as emergency calls in abnormal cases, and more specifically refers to bearer establishment for emergency sessions in abnormal situations.

Several problems may arise in ensuring a proper establishment of emergency sessions.

In 3GPP (Third Generation Partnership Program), it has been proposed that an MS (Mobile Station) with USIM (User Subscription Identity Module) performs Attach and signalling PDP context activation. When, at some point, the user of the MS intends to make an emergency session, the MS signals at PDP context activation that the PDP context will be used for an emergency session. In detail, an emergency session can be indicated by e.g. using the Source Statistics Descriptor parameter. The MS is responsible for properly setting the Source Statistics Descriptor parameter so as to indicate that the PDP context will be used for an emergency session.

Emergency sessions and PDP contexts used for them are of highest priority. The network is adapted to guarantee the establishment of an emergency session if it gets an indication and a confirmation classifying the session request to be an emergency session request.

The MS may however not always be able to set the Source Statistics Descriptor parameter. As an example, some MSs are adapted to check and compare a dialed number with stored emergency numbers and to set the Source Statistics Descriptor parameter representing an emergency session when detecting an emergency number. When, however, an actually dialed emergency number is not known by the MS, i.e. not configured to the MS, the MS will not set the Source Statistics Descriptor parameter so as to represent an emergency session.

Even without properly setting the Source Statistics Descriptor parameter, the PDP context activation for an emergency session should proceed. Normally, the serving node such as SGSN (Serving GPRS Support Node) is the first to make the decision whether or not to proceed with the PDP context activation.

However, in case of prepaid services, e.g. CAMEL based prepaid services, the serving node such as SGSN may communicate with a control means such as SCP (Service Control Point) at Attach and at PDP context activation. The control means decides about the continuation. If the prepaid account is empty, the control means normally does not let the user Attach or activate a PDP context. Such a case may also arise when the money in a prepaid account is divided, e.g., between the PDP contexts of a subscriber. The MS may be able to perform Attach and signalling PDP context activation, but there may be no money left in the prepaid account when the MS tries to activate a PDP context for an emergency session. In case of prepaid services, e.g. CAMEL based prepaid services, when establishing a session, another serving node such as CSCF (Call State Control Function) may communicate with a control means such as SCP (Service Control Point). The control means decides about the continuation. If the prepaid account is empty, the control means normally does not let the user establish the session. This is the IMS part. CSCF may communicate with SCP.

Further, there may be a case that the network does not let the MS enter the network. The MS may not be allowed to roam to the network due to subscription based restrictions, or the subscription information of the MS may be faulty, or the network considers the MS to be misbehaving, e.g., if the subscriber has not paid bills. The network may in such cases not allow the MS to perform Attach, i.e. may reject the Attach request. In case of an emergency session, the network should, however, let the Attach, the signalling PDP context activation and the emergency session proceed.

SUMMARY OF THE INVENTION

The present invention provides methods and systems for enabling emergency sessions to be established even in cases where a network would normally reject a connection request, e.g. when a prepaid account is empty or the subscription information is faulty or indicates the barring of connection requests.

According to one aspect, the invention provides a method and/or system for preventing barring of bearer establishment for an emergency session in a wireless communication system in a case where a subscriber is normally barred from establishing a bearer for a session, the system including at least one user equipment associated with a subscriber and a first network element authorizing bearer establishment. When an emergency session is to be set up by the user equipment, an indication is sent from the user equipment to said first network element, the indication indicating that the session to be established is an emergency session. When receiving said indication in said first network element, said first network element authorizes bearer establishment in response to said indication.

The user equipment may be commanded by the user of the user equipment to set up an emergency session e.g. in an emergency situation.

If e.g. the Source Statistics Descriptor parameter indicates 'emergency', the serving element, e.g. SGSN, sends an 'emergency' indication to the control means, e.g. SCP.

Another serving node such as CSCF (Call State Control Function) may also know, e.g. by analyzing the dialled number, if a session is an emergency session. In case of detecting an emergency session, the another control element sends an 'emergency' indication to the SCP. This is especially relevant if the MS can not set the Source Statistics Descriptor parameter and thus the SGSN can not send the 'emergency' indication to the SCP.

When receiving the indication(s), the SCP can let the PDP context activation proceed even if e.g. the prepaid account is empty. Without the indication(s), the PDP context activation would not proceed.

As described above, a problem may also appear if an MS requests Attach to the network for making an emergency session, and the network rejects this Attach Request, e.g., because the MS is not allowed to roam to the network. To solve this problem, the MS may indicate in the Attach Request (and/or PDP Context Activation Request) that an emergency session will follow.

The SGSN preferably checks that the session established after Attach is really an emergency session. If not, the session and PDP contexts are preferably forcibly terminated by the network.

Further details, aspects and advantages of the invention will be described below with reference to specific embodiments and the attached drawings.

DESCRIPTION OF PREFERRED EMBODIMENTS OF THE INVENTION

Figure 1:
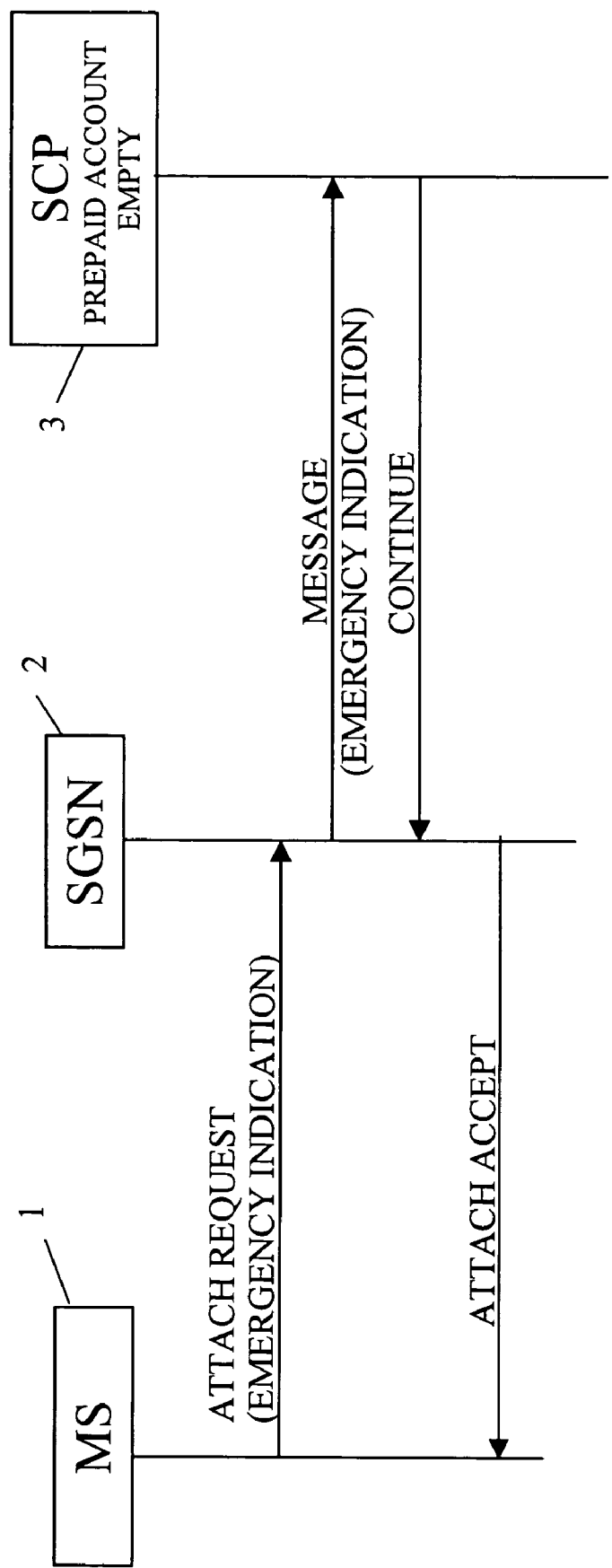
FIG. 1 shows a first embodiment of a method and system in accordance with the present invention.

FIG. 1 shows an embodiment of the invention which includes a session originating element, i.e. a session initiating element, such as a mobile station (MS) 1, a serving network element such as a Serving GPRS Support Node (SGSN) 2, and a further control element such as a Service Control Point (SCP) 3. The further network elements necessary for completing an IP multimedia session such as a terminating element, a gateway node if provided, a subscriber information register such as a home location register (HLR) or home subscriber server (HSS), etc. are known to the skilled man and are therefore neither shown nor described in more detail.

In all embodiments described above or below, the MS 1 may be equipped with a USIM (User Services Identity Module).

The embodiment of FIG. 1 relates to a case where the user has established a prepaid account, and the prepaid account managed by the SCP 3 is empty. In spite of this empty prepaid account, the user of the MS 1 intends to establish an emergency session because of an emergency case.

This and all further embodiments shown in the figures are implemented so as to allow the conduction of an emergency session even in abnormal cases such as "Prepaid Account Empty".

The embodiment of FIG. 1 relates to a case where the MS 1 is adapted to be able to inform the serving node SGSN 2 or another network element on an "emergency session", e.g. by setting an indication, e.g. the Source Statistics Descriptor parameter so as to indicate the fact that the intended session is an emergency session. In this case, the MS 1 is responsible for setting the indication, e.g. the Source Statistics Descriptor parameter.

When the MS 1 is performing a session initiating procedure such as an Attach procedure, for conducting the emergency session, the MS 1 preferably indicates in the initiation request to the SGSN 2, i.e. the Attach request, that an emergency session will follow (emergency indication). The SGSN 2 sends a message to SCP 3 containing the emergency indication. Because of this emergency indication, the SCP 3 returns a Continue message to the SGSN 2 for continuing with the Attach. In this manner, the network elements (e.g. the SGSN 2 or the SCP 3) are informed on the emergency case and can accept the Attach procedure, even if the prepaid account is empty. The SCP 3 therefore lets the user attach to the network. The SGSN 2 returns an Attach Accept message to the MS 1 for continuing with the emergency session.

Figure 2:
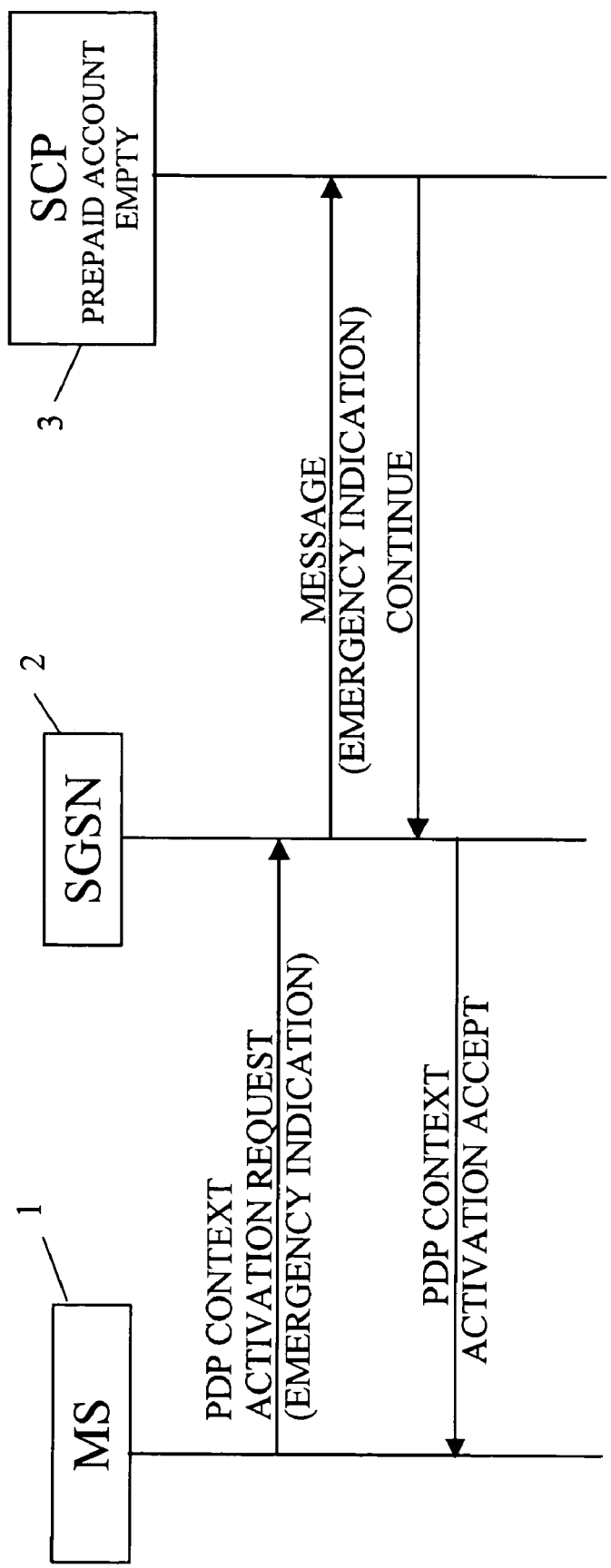
FIG. 2 shows a second embodiment of a method and system in accordance with the present invention.

Similar to the embodiment shown in FIG. 1, the embodiment of FIG. 2 relates to a case where the MS 1 is adapted to be able to inform the serving node SGSN 2 or another network element on an "emergency session", e.g. by setting an indication, e.g. the Source Statistics Descriptor parameter so as to indicate the fact that the intended session is an emergency session. The MS 1 is responsible for setting the indication, e.g. the Source Statistics Descriptor parameter.

When the MS 1 is performing a PDP context activation procedure, e.g. a signalling PDP context activation procedure or a PDP context activation procedure to carry the media of the emergency session, e.g., voice, for conducting the emergency session, the MS 1 indicates in the PDP Context Activation Request that an emergency session will follow (emergency indication). In this manner, the network (e.g. the SGSN 2 or the SCP 3) is informed on the emergency case and can accept the PDP context activation procedure. Similar to the case shown in FIG. 1, the SGSN 2 communicates with the SCP 3 at PDP context activation by sending an appropriate message indicating "emergency session" (e.g. emergency indication) from SGSN to SCP 3 after the SGSN 2 having received a PDP context activation request including an emergency indication from MS 1. Thereupon, the SCP 3 returns a Continue message to SGSN 2, even if the prepaid account is empty. The SCP 3 therefore lets the user activate a PDP context. The PDP Context Activation Accept message is then sent from SGSN 2 to MS 1. This process is likewise applicable to CAMEL based prepaid.

Figure 3:
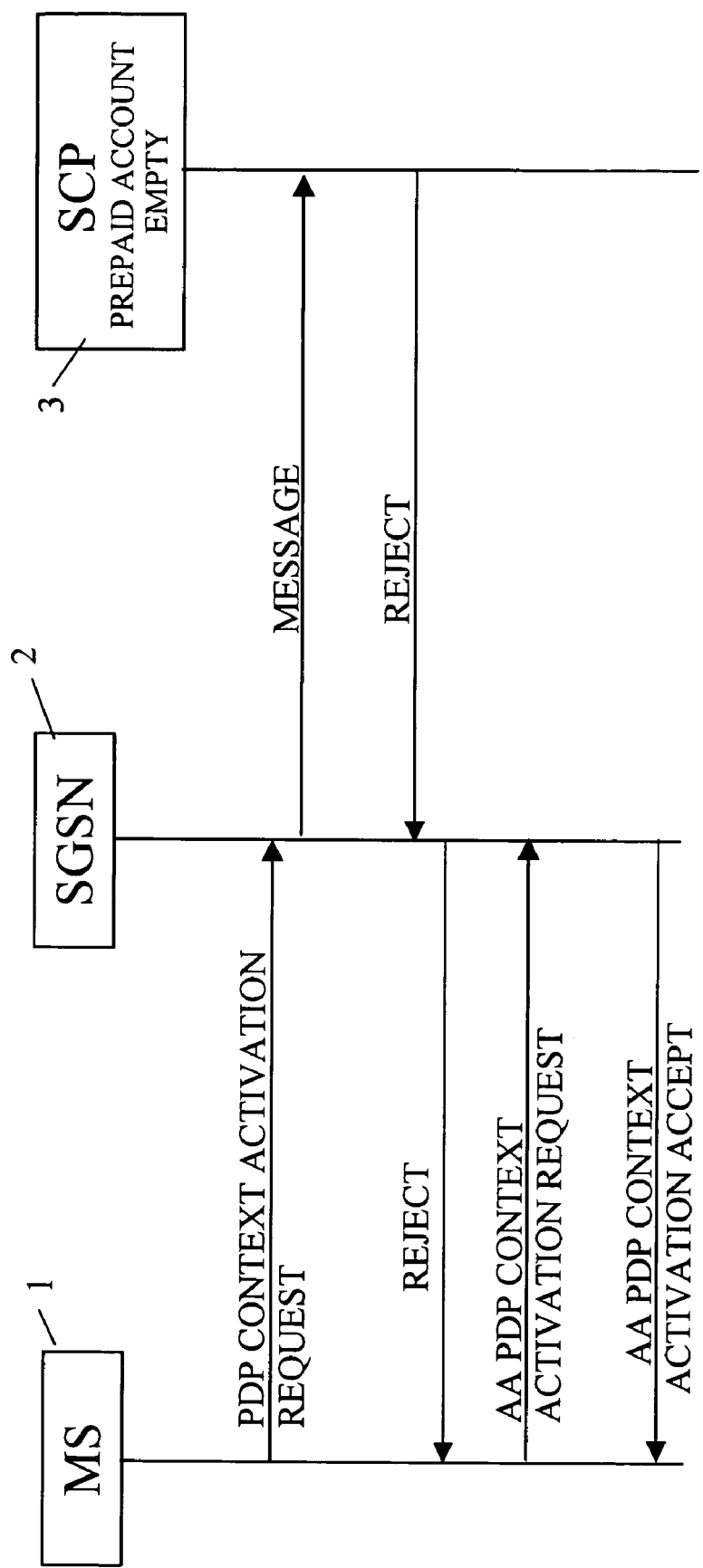
FIG. 3 illustrates a third embodiment of a method and system in accordance with the present invention.
Figure 4:
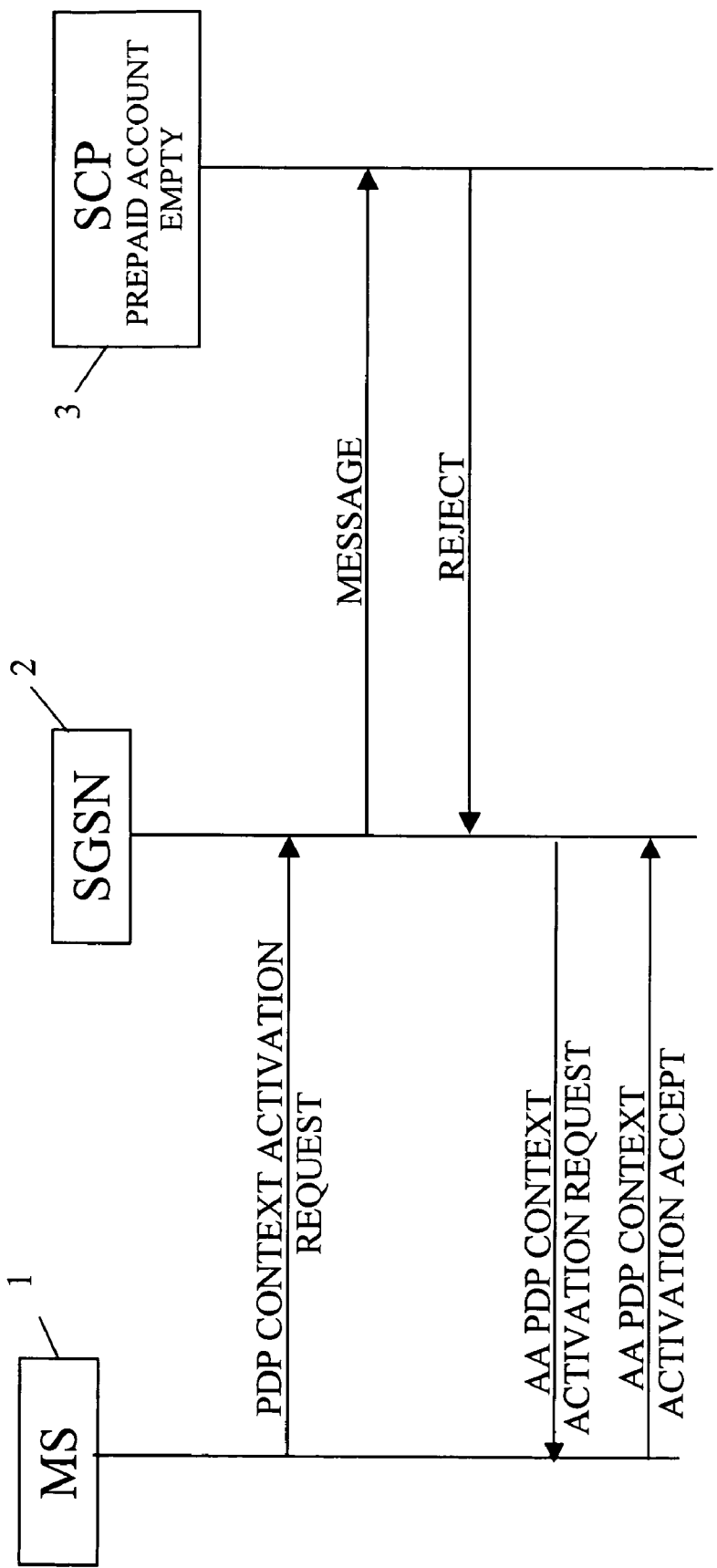
FIG. 4 shows a further embodiment of a method and system in accordance with the present invention.

The embodiment shown in FIG. 3 relates to a case where the prepaid account provided for the MS 1 is empty and the MS 1 is unable to indicate that the intended call is an emergency session. For instance, the MS 1 may be unable to set the Traffic Characteristics parameter, e.g. in a case in which the MS 1 sets the Traffic Characteristics parameter based on known emergency number and the dialled emergency number is not known by the MS 1, i.e. not configured to the MS 1. When the MS 1 sends an Attach Request or, as shown in FIG. 3, a PDP Context Activation Request to SGSN 2, the SGSN 2 normally rejects, after inquiring the SCP 3 and receiving a Reject message, the Attach Request or (signalling) PDP Context Activation request because the prepaid account is empty and it is unknown to the network that the intended session is an emergency session.

When receiving the Attach reject message or, as shown in FIG. 3, the activate PDP context activation reject message, the MS 1 is adapted to initiate an anonymous access (AA) PDP context activation by sending an AA PDP context activation request to the SGSN 2. Thereupon, the SGSN 2 returns an AA PDP Context Activation Accept message to the MS 1, and a connection procedure is completed so as to allow the MS 1 to make the emergency session to the dialled emergency number.

The SGSN 2 may send a message to SCP 3 informing the latter on the intended emergency session.

Figure 5:
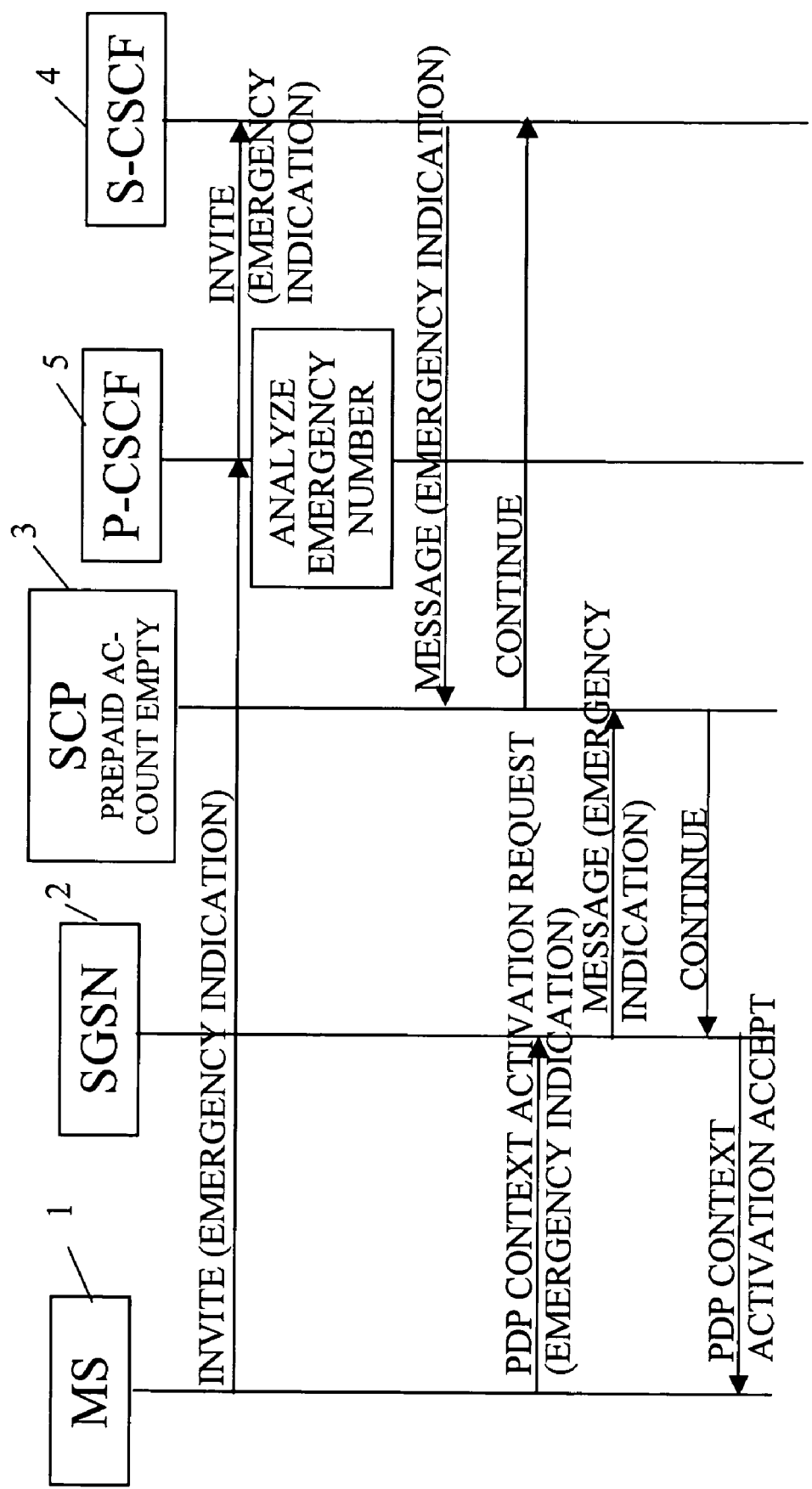
FIG. 5 shows a further embodiment of a method and system in accordance with the present invention.

FIG. 5 shows a basic structure and method steps for providing a network function of detecting whether or not an intended session, e.g. call, is an emergency session.

When an MS 1 intends to initiate an emergency session and is able to indicate "emergency", it sends a session initiation request, e.g. an INVITE message of SIP (Session Initiation Protocol) or other type of connection request to a Proxy CSCF (P-CSCF) 5 indicating the number to be called which in the present case is an emergency number. Before the network, i.e. a control element decides on barring the connection request, the network (P-CSCF 5) is adapted to analyse the dialled number for detecting whether or not it is an emergency number.

The proxy CSCF (P-CSCF) 5 may perform the analysing step by comparing the dialled number with a list of known (e.g. stored) emergency numbers. In the present case, the dialled number is an emergency number. The P-CSCF 5 therefore returns, to S-CSCF 4, an indication indicating that the dialled number is an emergency number, i.e. that the session to be made is an emergency session, e.g. by sending an INVITE message indicating emergency to the Serving CSCF (S-CSCF) 4, so as to continue with the emergency session. The S-CSCF 4 sends a message indicating emergency session to the SCP 3 which responds with a Continue message, and lets the SGSN 2 proceed with a PDP Context Activation procedure to carry the media of the emergency session. In detail, the MS 1 sends, to SGSN 2, a PDP Context Activation request with emergency indication. The SGSN 2 transmits a message with emergency indication to SCP 3 which returns a Continue message to SGSN 2. The SGSN 2 thereupon returns a PDP Context Activation Accept message to MS 1 so as to proceed with the emergency session.

In the case shown in FIG. 5, the SCP 3 can get the "emergency" indication and confirmation only from S-CSCF 4 as there is an interface between S-CSCF 4 and SCP 3 but no interface between SCP 3 and P-CSCF 5. The P-CSCF 5 analysing the dialled number therefore sends the "emergency" indication to the S-CSCF 4, e.g. in a SIP (Session Initiation Protocol) message, for instance in the INVITE message. With this information, the SCP 3 can inform the SGSN 2 to proceed with PDP context activation as generally represented in FIG. 5.

The indications "emergency indication" sent to S-CSCF 4, SCP 3 and SGSN 3 and shown in FIG. 5 may be different from network element to network element. It is only necessary that the message receiving element understands that the intended session is an emergency session to be connected through.

The analysing procedure shown in FIG. 5, or more generally, the network function of detecting whether or not an intended session is an emergency session, can be implemented in all other embodiments shown in the other drawings as well.

Figure 6:
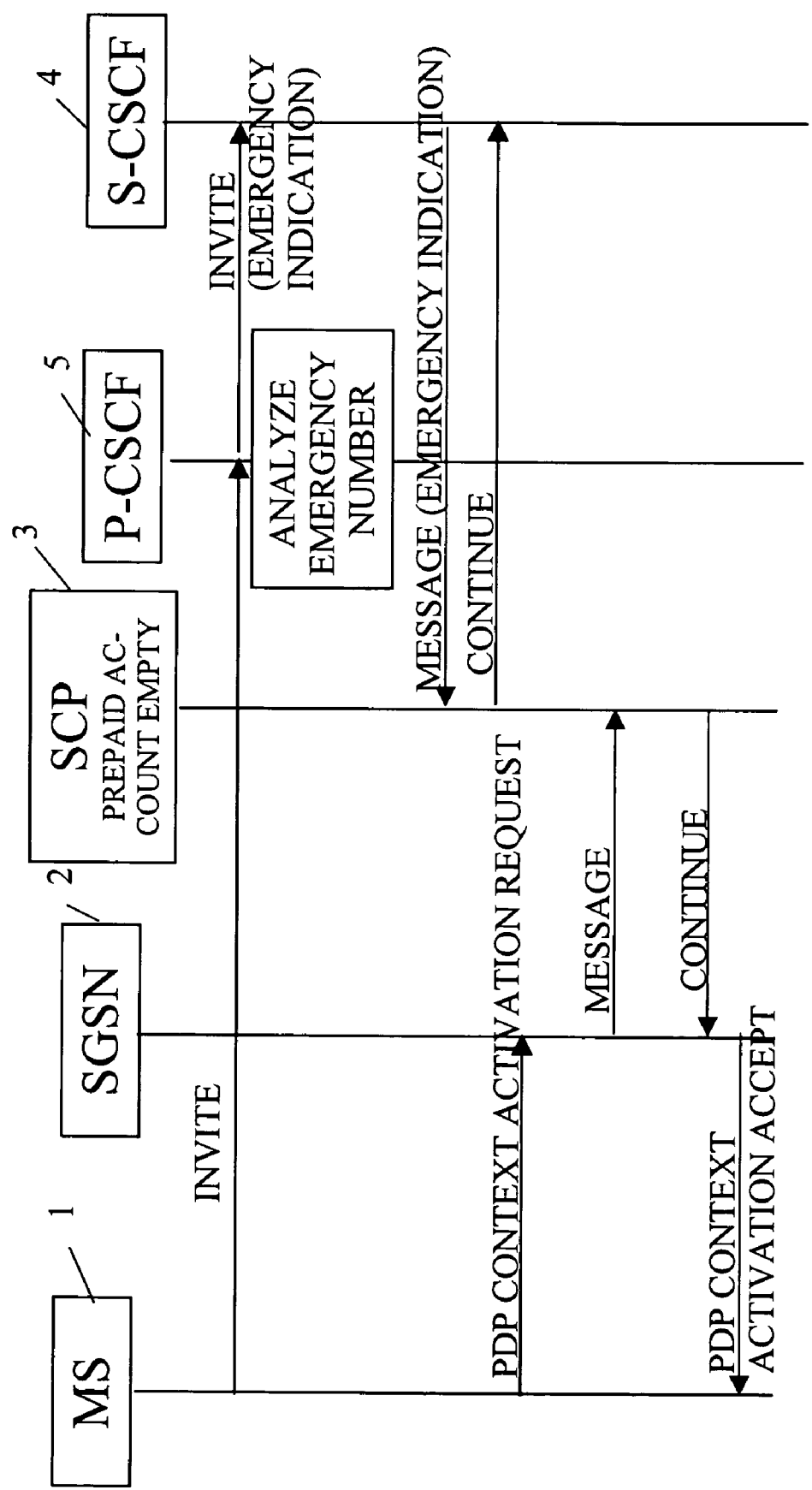
FIG. 6 illustrates another embodiment of a method and system in accordance with the present invention.

FIG. 6 shows a basic structure and method steps for providing a network function of detecting whether or not an intended session, e.g. call, is an emergency session. The embodiment shown in FIG. 6 is quite similar to the one shown in FIG. 5, with the exception that it is also applicable to a case where the MS 1 is unable to indicate that a session to be initiated is an emergency session.

When an MS 1 intends to initiate an emergency session but is unable to indicate "emergency session", it sends a session initiation request, e.g. an INVITE message of SIP (Session Initiation Protocol) or other type of connection request to a Proxy CSCF (P-CSCF) 5 indicating the number to be called.

This request does not contain any indication that the session is an emergency session and that the called number is an emergency number. Before the network, i.e. a control element decides on barring the connection request, the network (P-CSCF 5) is adapted to analyse the dialled number for detecting whether or not it is an emergency number. Similar to the embodiment of FIG. 5, the proxy CSCF (P-CSCF) 5 may perform the analysing step by comparing the dialled number with a list of known (e.g. stored) emergency numbers. As, in the present case, the dialled number is an emergency number, the P-CSCF 5 returns, to S-CSCF 4, an indication indicating that the dialled number is an emergency number, i.e. that the session to be made is an emergency session, e.g. by sending an INVITE message indicating emergency to the Serving CSCF (S-CSCF) 4, so as to continue with the emergency session. The S-CSCF 4 sends a message indicating emergency session to the SCP 3 which responds with a Continue message, and lets the SCP proceed with a PDP context activation procedure to carry the media of the emergency session. In detail, the MS 1 sends, to SGSN 2, a PDP Context Activation Request. The SGSN 2 transmits a message to SCP 3 which returns a Continue message to SGSN 2. The SGSN 2 thereupon returns a PDP Context Activation Accept message to MS 1 so as to proceed with the emergency session.

Similar to the above case shown in FIG. 5, the SCP 3 can get the "emergency" indication only from S-CSCF 4 via the interface between S-CSCF 4 and SCP 3. The P-CSCF 5 analysing the dialled number therefore sends the "emergency" indication to the S-CSCF 4, e.g. in a SIP (Session Initiation Protocol) message, for instance in the INVITE message. With this information, the SCP 3 can inform the SGSN 2 to proceed with PDP context activation as generally represented in FIG. 6. The "emergency indication" sent to S-CSCF 4, SCP 3 and SGSN 3 and shown in FIG. 6 may be different from network element to network element. It is only necessary that the message receiving element understands that the intended session is an emergency session to be connected through.

Figure 7:
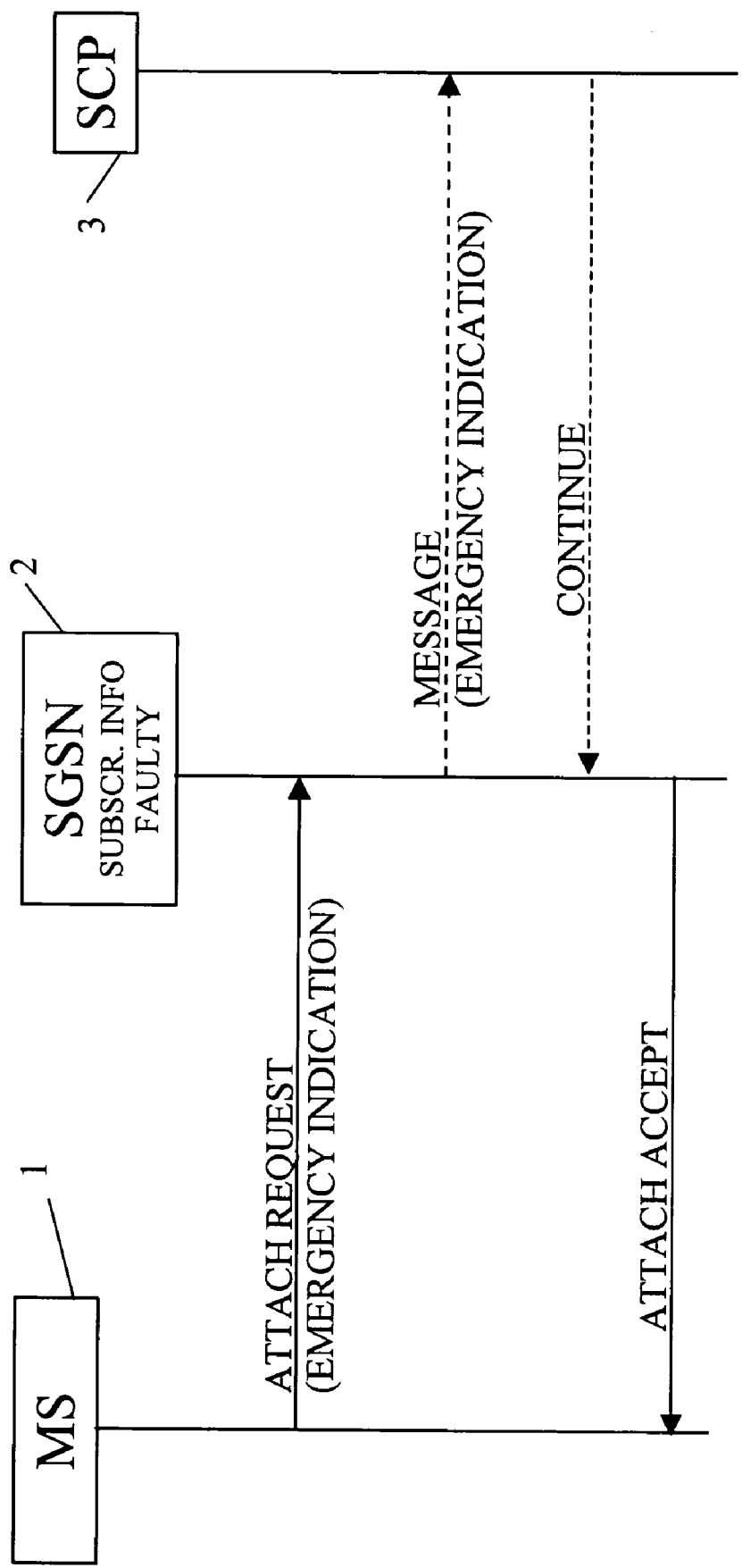
FIG. 7 illustrates a further embodiment of the present invention.

The embodiment shown in FIG. 7 relates to a case where an MS 1 will normally not be allowed to enter the network and thus will not be allowed to initiate a session. This may happen in cases where the subscriber information indicates the MS 1 to be e.g. a "misbehaving" MS 1 because e.g. the subscriber has not paid bills, or if all roaming is barred from the subscriber.

The embodiment shown in FIG. 7 represents a case where MS 1 is able to indicate "emergency", e.g. by appropriately setting the Source Statistics Descriptor parameter but something is invalid or wrong in the subscription information. When the MS 1 is performing Attach procedure by sending an Attach request to the SGSN 2 for initiating an emergency session, the MS 1 is adapted to indicate, in the Attach request, that an emergency session is to be initiated, as shown in FIG. 7. The SGSN 2 receiving the request and emergency indication is therefore informed on the emergency session to be placed by MS 1 so that the network, e.g. SGSN 2, can accept the Attach procedure, even if something is invalid or defective in the subscription information. The SGSN 2 may optionally send a message to SCP 3 for informing the latter on the emergency session to be performed. The SCP 3 may in this case return a message, e.g. Continue message to SGSN 2, for proceeding with the session whereupon the SGSN 2 sends an Attach Accept to the MS 1.

Figure 8:
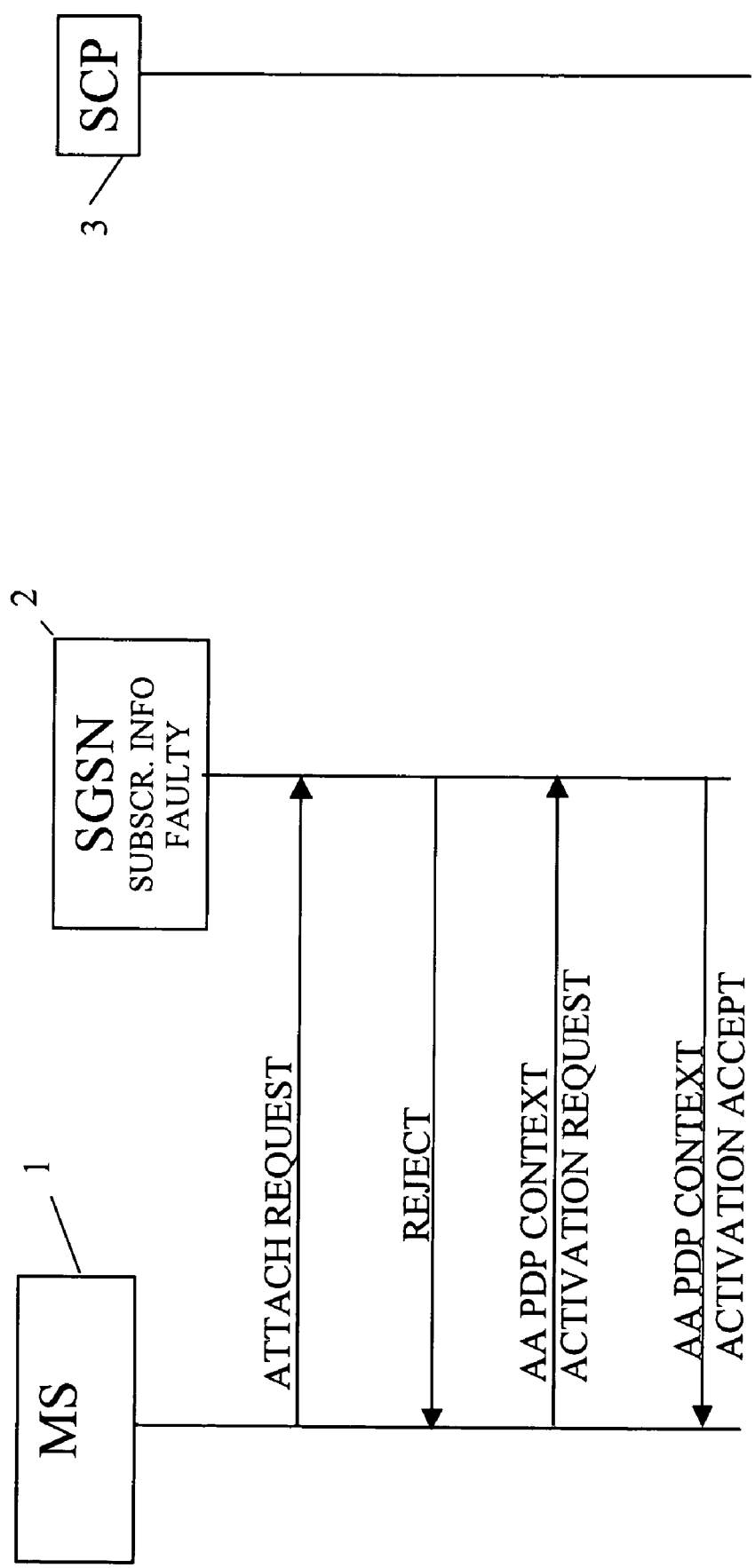
FIG. 8 shows another embodiment of a method and system in accordance with the present invention.
Figure 9:
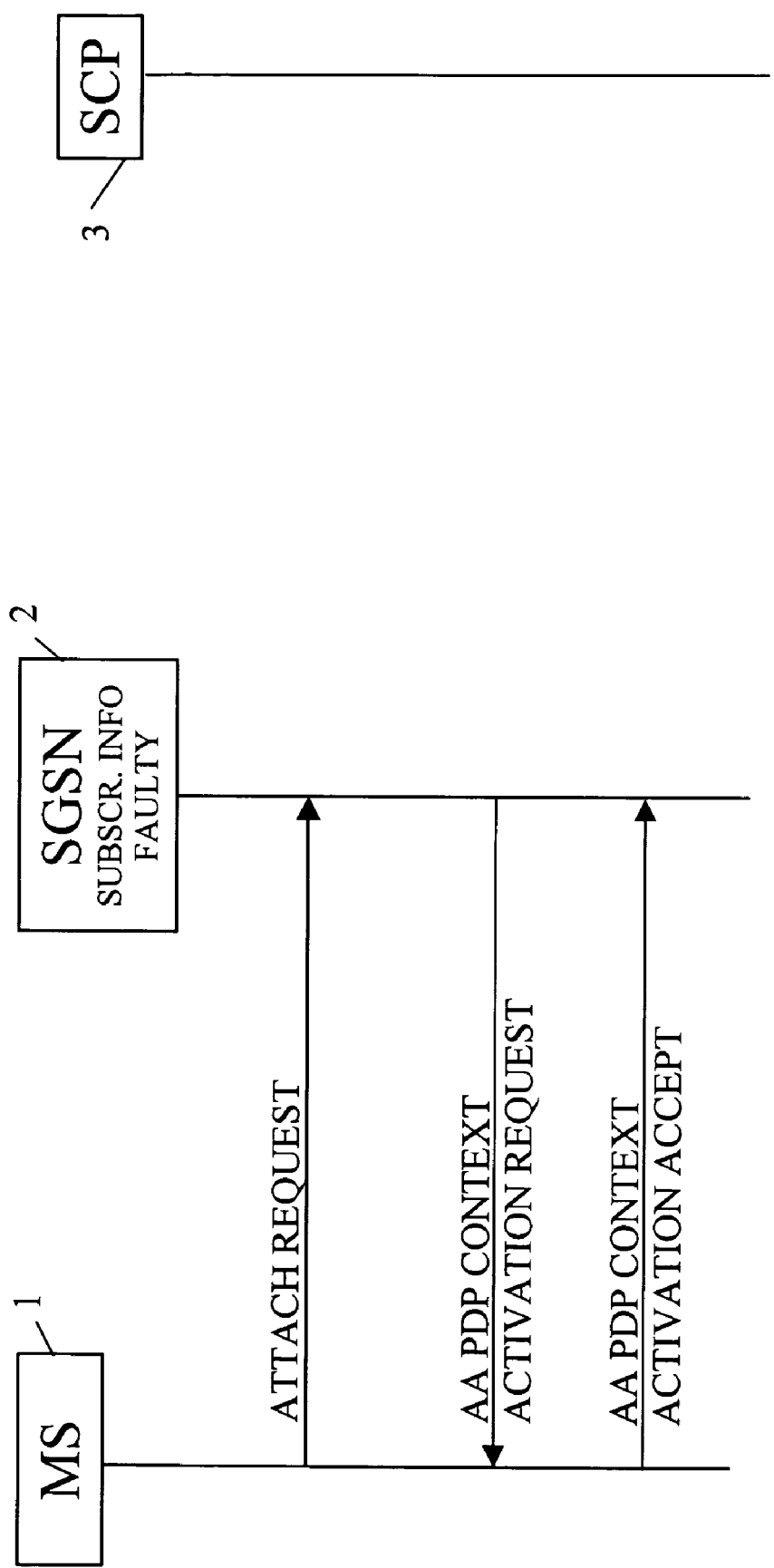
FIGS. 9 to 12 illustrate further embodiments of a method and system in accordance with the present invention.
Figure 10:
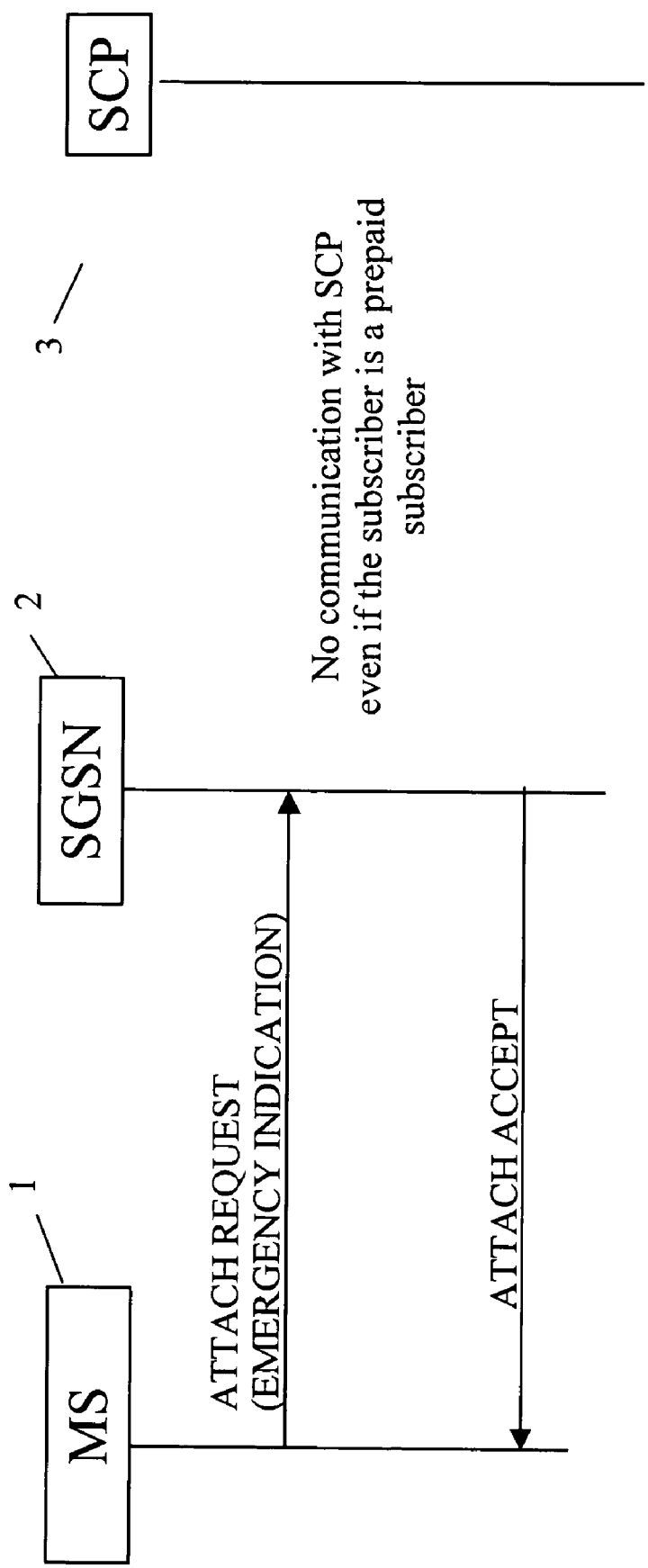

FIG. 8 shows a further embodiment of the invention and relates to a case in which the subscription information of MS 1 is faulty or comprises information requesting suppression of all sessions to be originated from MS 1. In the case of FIG. 8, MS 1 is unable to include an emergency indication in the Attach Request sent to SGSN 2. The SGSN 2 therefore responds by sending the Attach Reject message rejecting the Attach request. Similar to the embodiment of FIG. 3, the embodiment of FIG. 8 is adapted to react to the reject message received from SGSN 2 by initiating anonymous access (AA) PDP context activation by sending the AA PDP context Activation Request message to SGSN 2. The SGSN 2 returns an AA PDP Context Activation Accept message and performs a usual AA connection procedure for allowing the emergency session to be performed FIG. 10 is similar to FIG. 1. The MS 1 performs the Attach procedure and is able to indicate that an emergency session will follow with "emergency indication". When receiving the Attach Request with "emergency indication", the SGSN 2 does not communicate with the SCP 3 even if the subscriber is a prepaid subscriber. This way, the Attach procedure proceeds immediately and the SGSN 2 sends the Attach Accept message to the MS 1.

Figure 11:
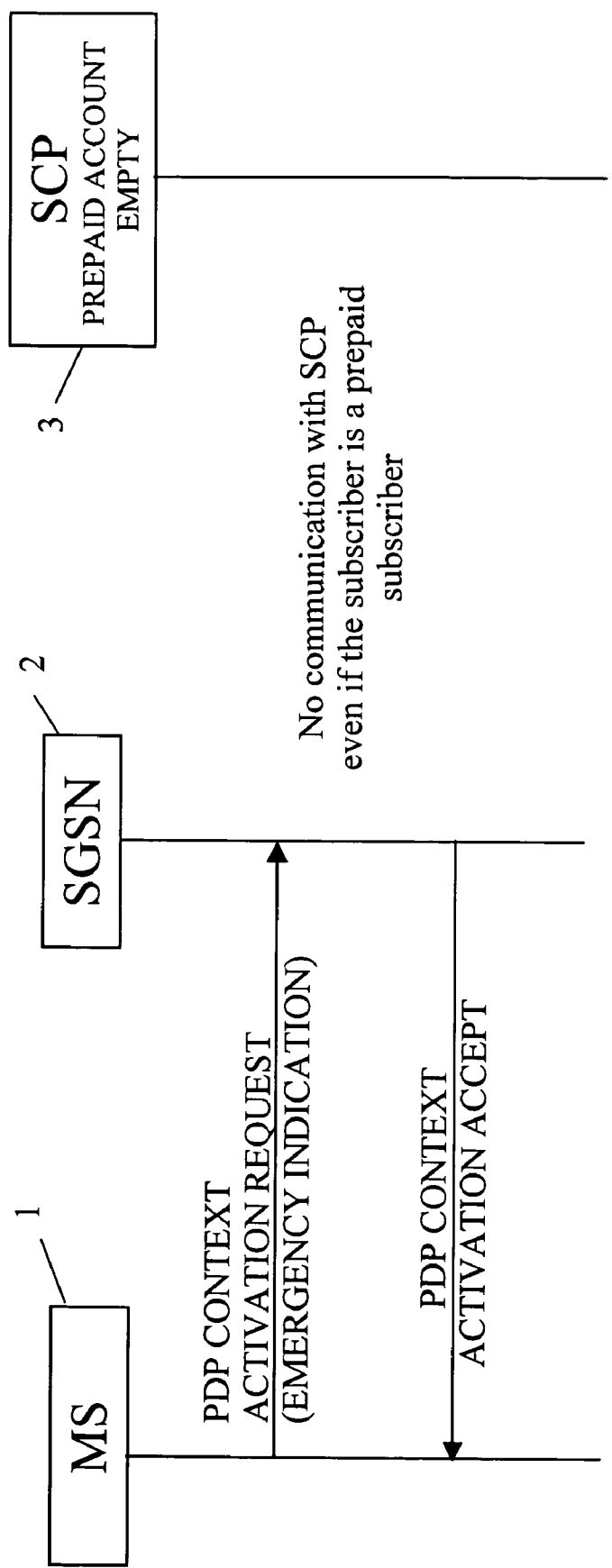

FIG. 11 is similar to FIG. 2. The MS 1 performs PDP context activation procedure and is able to indicate that an emergency session will follow. The MS 1 adds "emergency indication" to the PDP Context Activation Request message. When receiving the PDP Context Activation Request message, the SGSN 2 does not communicate with the SCP 3 even if the subscriber is a prepaid subscriber. This way, the PDP context activation procedure proceeds immediately and the SGSN 2 sends the PDP Context Activation Accept message to the MS 1.

Figure 12:
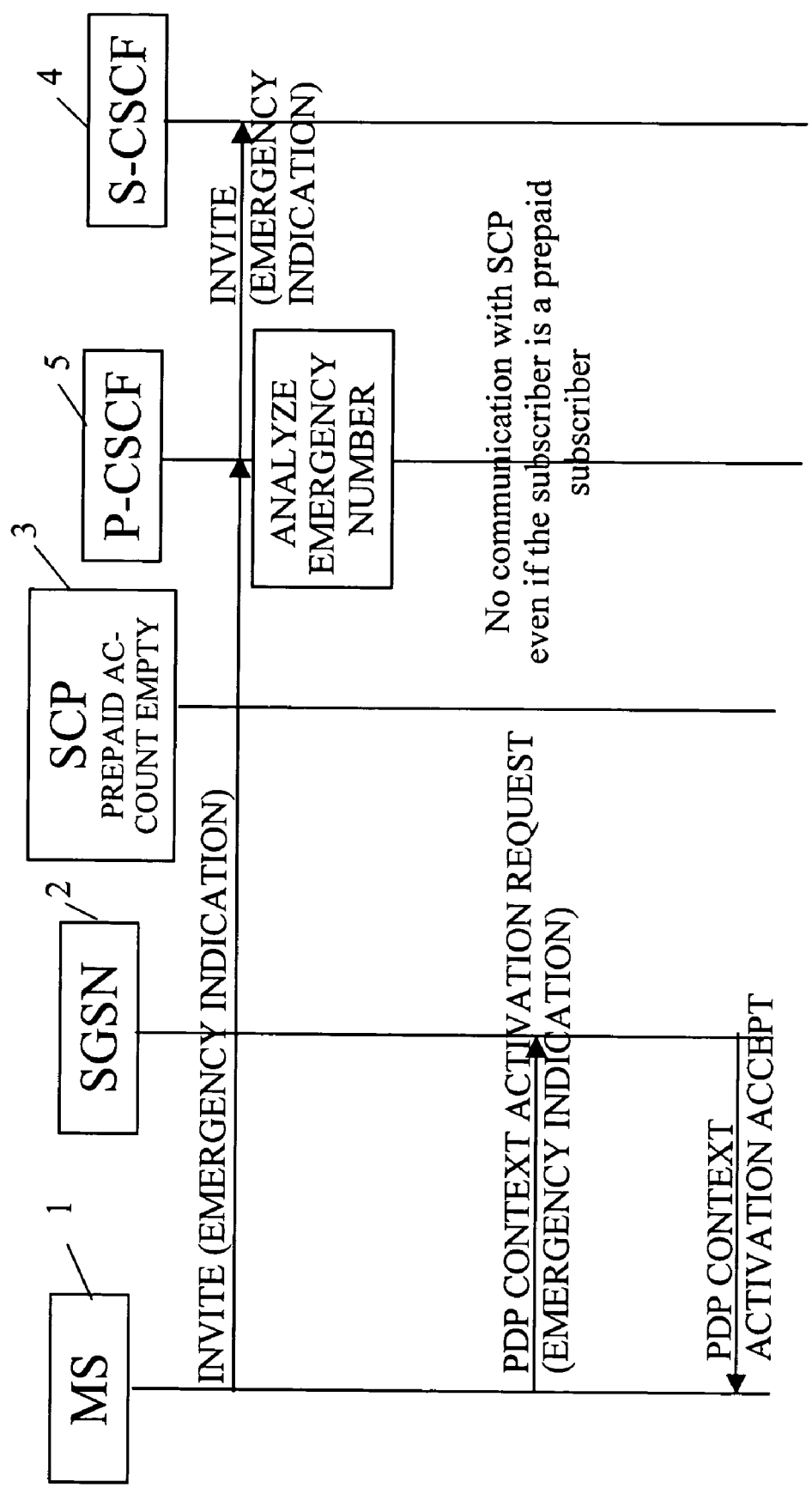

FIG. 12 is similar to FIG. 5. The MS 1 establishes an emergency session. The S-CSCF 4 receiving the INVITE message with "emergency indication" does not communicate with the SCP 3 even if the subscriber is a prepaid subscriber. The MS 1 performs the PDP context activation procedure to carry the media of the emergency session. The MS is able to indicate that an emergency session will follow. The SGSN 2 receiving the PDP Context Activation Request with "emergency indication" does not communicate with the SCP 3 even if the subscriber is a prepaid subscriber. This way, the emergency session and the PDP context activation proceed immediately.

In all above-described embodiments, the emergency session detection by the network, e.g. implemented by analysing the dialled number (number of the terminating equipment) as shown in FIGS. 5, 6, can additionally or alternatively be implemented. When the control means e.g. SCP 3, has received the emergency session indication from the analyzing means, e.g. from P-CSCF 5 via S-CSCF 4 after number analysis, the control means, e.g. SCP 3 can let the attach or PDP context activation or session establishment proceed.

The teaching according to the invention may be employed in networks of various types, i.e. in IMS, GPRS and UMTS domains.

Although the invention has been described above with reference to specific embodiments, the scope of protection of the invention intends to cover all modifications, omissions, additions and amendments of the disclosed features as well.

In the claims:

1. A method, comprising:
preventing barring of bearer establishment for an emergency session in a wireless communication system;
receiving, when an emergency session is to be set up for a user equipment, an attach request or packet data protocol context activation request from the user equipment, the attach request or packet data protocol context activation request including an indication indicating that the session to be established is an emergency session;
receiving said indication in a first network element, said first network element authorizing, or being controlled to authorize, bearer establishment in response to said indication;
establishing a session after receiving attach request or packet data protocol context activation request comprising the indication indicating that the session to be established is an emergency session;
checking that the established session established after the attach request or packet data protocol context activation request, is indeed an emergency session; and
when the checking indicates that the session established after the attach request or packet data protocol context activation request is no emergency session, forcibly terminating the established session.

2. Method according to claim 1, wherein the barring is due to defective subscriber information.

3. Method according to claim 1, wherein the subscriber has a prepaid account for prepaid billing, and the barring is due to the prepaid account being empty.

4. Method according to claim 1, wherein the barring is due to roaming of the subscriber.

5. Method according to claim 1, wherein the first network element is a serving network element.

6. Method according to claim 5, wherein the serving network element is a serving general packet radio service support node.

7. Method according to claim 1, wherein the indication is sent in the attach request or a packet data protocol context activation request.

8. Method according to claim 1, wherein the first network element forwards said indication to a second network element, the second network element checking the indication and deciding on authorizing the first network element to establish a bearer connection with the user equipment.

9. Method according to claim 8, wherein said second network element detects the balance of a prepaid account provided for the user equipment and regardless of the balance authorizes the bearer establishment procedure.

10. Method according to claim 1, wherein said indication is the called address.

11. Method according to claim 10, further comprising extracting the indication from the called address.

12. Method according to claim 1, wherein, when the user equipment is already attached to a network, the network receives an activate packet data protocol context activation request from the user equipment which request includes the indication.

13. Method according to claim 1, wherein the attach request or packet data protocol context activation request is sent to a all state control function, which analyzes the indication for detecting whether or not it is an emergency number.

14. Method according to claim 13, wherein the call state control function, is a proxy call state control function, which sends a message including an emergency indication to a serving call state control function.

15. Method according to claim 14, wherein the serving call state control function sends a message comprising an emergency indication to a network element which informs the first network element to continue with the session.

16. System, comprising:
first network element authorizing bearer establishment,
wherein the system is configured to receive, when an emergency session is to be set up for a user equipment associated with a subscriber, an attach request or racket data protocol context activation request from the user equipment, the attach request or packet data protocol context activation request including an indication indicating that the session to be established is an emergency session;
the first network element being configured, to receive said indication and to authorize bearer establishment in response to said indication,
wherein the system is configured to
establish a session after receiving the attach request or packet data protocol context activation request including the indication indicating that the session to be established is an emergency session,
check that the established session, established after the attach request or racket data protocol context activation request, is indeed an emergency session, and forcibly terminate the established session when the check indicates that the session established after the attach request or packet data protocol context activation request is no emergency session.

17. System according to claim 16, wherein the barring is due to defective subscriber information.

18. System according to claim 16, wherein the subscriber has a prepaid account for prepaid billing, and the barring is due to the prepaid account being empty.

19. System according to claim 16, wherein the barring is due to roaming of the subscriber.

20. System according to claim 16, wherein the first network element is a serving network element.

21. System according to claim 20, wherein the serving network element is a serving general packet radio service support node.

22. System according to claim 16, wherein the indication is comprised in the attach request or packet data protocol context activation request or a packet data protocol context activation request.

23. System according to claim 16, wherein said first network element is configured to forward said indication to a second network element, and the second network element is configured to check the indication and to decide on authorizing the first network element to establish a bearer connection with the user equipment.

24. System according to claim 23, wherein said second network element is configured to detect the balance of a prepaid account provided for the user equipment and to authorize, regardless of the balance, the bearer establishment procedure.

25. System according to claim 16, wherein said indication is the called address.

26. System according to claim 25, wherein the system is configured to extract the indication from the called address.

27. System according to claim 16, wherein, when the user equipment is already attached to a network, the network is configured to receive an activate packet data protocol context request from the user equipment which request comprises the indication.

28. System according to claim 16, wherein the system is configured to send the attach request or racket data protocol context activation request to a call state control function, which is configured to analyze the indication for detecting whether or not it is an emergency number.

29. System according to claim 28, wherein the call state control function is a proxy call state control function, which is configured to send a message including an emergency indication to a serving call state control function.

30. System according to claim 29, wherein the serving call state control function is configured to send a message comprising an emergency indication to a network element which informs the first network element to continue with the session.

31. An apparatus, comprising:
a receiver configured to receive an attach request or packet data protocol context activation request from a user equipment, the attach request or packet data protocol context activation request including an indication indicating that the session to be established is an emergency session;
a processor configured to authorize, or to be controlled to authorize, bearer establishment in response to said indication,
wherein the processor is configured to
establish a session after receiving the attach request or packet data protocol context activation request including the indication indicating that the session to be established is an emergency session,
check that the established session, established after the attach request or packet data protocol context activation request, is indeed an emergency session, and
forcibly terminate the established session when the check indicates that the session established after the attach request or packet data protocol context activation request is no emergency session.

32. An apparatus, comprising:
preventing means for preventing barring of bearer establishment for an emergency session in a wireless communication system, the apparatus comprising a first network element configured to authorize, or to be controlled to authorize bearer establishment;
receiving means for receiving, when an emergency session is to be set up for a user equipment associated with a subscriber, an attach request or packet data protocol context activation request from the user equipment, the attach request or packet data protocol context activation request including an indication indicating that the session to be established is an emergency session;
receiving means for receiving said indication in said first network element, said first network element authorizing, or being controlled to authorize, bearer establishment in response to said indication;
establishing means for establishing a session after receiving the attach request or packet data protocol context activation request including the indication indicating that the session to be established is an emergency session;
checking means for checking that the established session established after the attach request or packet data protocol context activation request, is indeed an emergency session; and
terminating means for forcibly terminating, when the checking indicates that the session established after the attach request or packet data protocol context activation request is no emergency session, the established session.

33. Apparatus according to claim 31, wherein the barring is due to defective subscriber information.

34. Apparatus according to claim 31, wherein the subscriber has a prepaid account for prepaid billing, and the barring is due to the prepaid account being empty.

35. Apparatus according to claim 31, wherein the barring is due to roaming of the subscriber.

36. Apparatus according to claim 31, wherein the first network element is a serving network element.

37. Apparatus according to claim 36, wherein the serving network element is a serving general packet radio service support node.

38. Apparatus according to claim 31, configured to send the indication in the attach request or a packet data protocol context activation request.

39. Apparatus according to claim 31, wherein the first network element is configured to forwards said indication to a second network element, the second network element being configured to check the indication and decide on authorizing the first network element to establish a bearer connection with the user equipment.

40. Apparatus according to claim 39, wherein said second network element is configured to detect the balance of a prepaid account provided for the user equipment and regardless of the balance to authorize the bearer establishment procedure.

41. Apparatus according to claim 31, wherein said indication is the called address.

42. Apparatus according to claim 41, further being configured to extract the indication from the called address.

43. Apparatus according to claim 31, being configured to receive, when the user equipment is already attached to a network, an activate packet data protocol context activation request from the user equipment which request includes the indication.

44. Apparatus according to claim 31, being configured to send the attach request or packet data protocol context activation request to a call state control function, which is configured to analyze the indication for detecting whether or not it is an emergency number.

45. Apparatus according to claim 44, wherein the call state control function, is a proxy call state control function, which is configured to send a message including an emergency indication to a serving call state control function.

46. Apparatus according to claim 45, wherein the serving call state control function is configured to send a message comprising an emergency indication to a network element which is configured to inform the first network element to continue with the session.

* * * * *